(12) United States Patent
Virelizier

(10) Patent No.: US 9,844,910 B2
(45) Date of Patent: Dec. 19, 2017

(54) MACHINE FOR STAMPING AND/OR WELDING ONTO A BUMPER SKIN

(75) Inventor: Francois Virelizier, Saint Marcel Bel Accueil (FR)

(73) Assignee: Compagnie Plastic Omnium, Lyons (FR)

( * ) Notice: Subject to any disclaimer, the term of this patent is extended or adjusted under 35 U.S.C. 154(b) by 75 days.

(21) Appl. No.: 13/818,856

(22) PCT Filed: Aug. 25, 2011

(86) PCT No.: PCT/FR2011/051964
§ 371 (c)(1),
(2), (4) Date: Feb. 16, 2014

(87) PCT Pub. No.: WO2012/025698
PCT Pub. Date: Mar. 1, 2012

(65) Prior Publication Data
US 2014/0150978 A1     Jun. 5, 2014

(30) Foreign Application Priority Data
Aug. 26, 2010 (FR) ..................................... 10 56790

(51) Int. Cl.
*B26F 1/02* (2006.01)
*B29C 65/74* (2006.01)
(Continued)

(52) U.S. Cl.
CPC ................ *B29C 65/74* (2013.01); *B26F 1/02* (2013.01); *B29C 65/7451* (2013.01);
(Continued)

(58) Field of Classification Search
CPC ......... B26F 1/02; B29C 65/74; B29C 66/532; B29C 66/843
(Continued)

(56) References Cited

U.S. PATENT DOCUMENTS 5,266,770 A * 11/1993 Noe ....................... B23D 15/06
219/121.63
5,491,320 A * 2/1996 Taylor .................... B23K 9/325
219/125.1
(Continued)

FOREIGN PATENT DOCUMENTS

DE  10 2009 019 644 A1   11/2010
EP   1 586 427 A2   10/2005
(Continued)

OTHER PUBLICATIONS

International Search Report received in International Application No. PCT/FR2011/051964 and dated Oct. 31, 2011.
(Continued)

*Primary Examiner* — Mark A Osele
*Assistant Examiner* — Christopher C Caillouet
(74) *Attorney, Agent, or Firm* — Harness, Dickey & Pierce, P.L.C.

(57) ABSTRACT

The invention relates to a punching and/or welding machine for acting on a piece of motor vehicle bodywork that is made of plastics material, the machine having movable punching and/or welding tools, each of which is adjusted to perform a punching and/or welding operation and that are transferred from a waiting position to a working position for performing the punching and/or welding operation, the punching and/or welding operation being performed in three stages:
  a) transferring from a waiting position at a distance from a skin of the piece in order to come into a working position in contact with the skin;
  b) performing the punching and/or the welding; and then
  c) returning to the waiting position;
the device further comprising a support for receiving the skin in a determined position. The support and the movable tools are arranged in such a manner that, once the skin has been positioned on the support, it defines, possibly in
(Continued)

association with a protective screen, a safety volume within which the movable tools move in order to perform the punching and/or welding operations on the skin.

16 Claims, 2 Drawing Sheets

(51) Int. Cl.
*B29C 65/00* (2006.01)
*B29C 65/78* (2006.01)
*B26D 7/08* (2006.01)
*B29C 65/08* (2006.01)
*B29L 31/30* (2006.01)
*B60R 19/48* (2006.01)

(52) U.S. Cl.
CPC .......... *B29C 65/7457* (2013.01); *B29C 65/78* (2013.01); *B29C 65/7841* (2013.01); *B29C 66/532* (2013.01); *B29C 66/8221* (2013.01); *B29C 66/8322* (2013.01); *B29C 66/8324* (2013.01); *B29C 66/843* (2013.01); *B29C 66/8742* (2013.01); *B26D 7/086* (2013.01); *B29C 65/08* (2013.01); *B29C 66/474* (2013.01); *B29C 66/8242* (2013.01); *B29C 66/876* (2013.01); *B29L 2031/3044* (2013.01); *B29L 2031/3055* (2013.01); *B60R 19/48* (2013.01); *Y10T 83/8748* (2015.04); *Y10T 156/1304* (2015.01)

(58) Field of Classification Search
USPC .................................. 156/510, 513, 515, 556
See application file for complete search history.

(56) References Cited

U.S. PATENT DOCUMENTS 5,554,252 A * 9/1996 Foran ............................ 156/497
7,325,581 B2 2/2008 Braun
7,469,455 B2 * 12/2008 Distel ...................... B26F 1/02
29/33 R

FOREIGN PATENT DOCUMENTS

EP 1 798 019 A1 6/2007
EP 2 070 668 A1 6/2009

OTHER PUBLICATIONS

Mexican Office Action dated Mar. 28, 2016, for corresponding Mexican application No. MX/a/2013/002204 and Partial English Translation thereof.

* cited by examiner

MACHINE FOR STAMPING AND/OR WELDING ONTO A BUMPER SKIN

FIELD OF THE INVENTION

The present invention relates to a machine for welding and/or punching on a bumper skin, for example in order to fasten sensors for providing assistance in parking, or headlight-washers, or even grilles, or reinforcements.

BACKGROUND OF THE INVENTION

In order to perform such operations on bumper skins, use is already being made of machines of the type constituted by a bench carrying retractable structures, which in turn support punching and/or welding tools. Moving the retractable structures makes it possible to clear space above a location for receiving a bumper skin in order to make the skin easier to handle and to put into position. Once the skin is in place, the movable structures are returned to their operating position, thereby enabling the tools to operate. The operation of the tools may involve making use of actuators that move said tools in order to bring them into contact with the skin.

In addition to retractable structures, there are also provided removable and/or stationary protections (that may be intangible, e.g. being of the infrared curtain type) having a function of preventing any contact between a user and the tools while they are in movement, which tools are considered, as being dangerous because of their movements under drive from above-mentioned actuators. The protections are screens of large size that are interposed between the user and the skin, and they are optionally coupled to the retractable structures.

EP 1 798 019 discloses an example of such a screen, in the form of a safety light curtain and/or of a grid.

OBJECT AND SUMMARY OF THE INVENTION

One of the problems the invention seeks to solve is that of the overall size of such devices. This size presents a cost in terms of space occupied, of cycle duration (travel times being lengthened with greater travel spans), and of maintenance. Another problem is that of the cost of direct investments represented by the protection systems themselves.

The invention provides a punching and/or welding machine for acting on a skin of a piece of motor vehicle bodywork that is made of plastics material, the machine having movable punching and/or welding tools, each of which is adjusted to perform a punching and/or welding operation, the punching and/or welding operation being performed in three stages:

a) transferring from a retracted position at a distance from the skin in order to come into a working position in contact with or in the immediate proximity of the skin;

b) performing the punching and/or the welding; and then c) returning to the retracted position;

the device further comprising a support for receiving the skin in a determined position, wherein the support and the movable tools are arranged in such a manner that, once the skin has been positioned on the support, it defines, possibly in association with a protective screen, a safety volume within which the movable tools move in order to perform the punching and/or welding operation on the skin.

In the meaning of the invention, the tools are said to be "movable" because they perform movements, generally of small attitude, during a punching and/or welding operation. The fact that the tools are also retractable and that they are subjected to transfers of larger attitude seeking to leave clearance so as to make it easier to put the skin into place is not considered as making the tools "movable" in the meaning of the invention, since that movement does not take place during an operation of punching and/or welding.

The term "in contact with or in the immediate proximity of the skin" is used to designate a distance that is zero or a few tenths of a millimeter from the skin, i.e. ready to perform the intended punching and/or welding operation on the skin.

Since the skin is used to define the safety volume within which the movable tools perform their small movements during punching and/or welding, an advantage of the invention is that the safety volume is limited to the volume that is strictly needed, and the drawbacks of the retractable structures of the prior art are avoided.

According to the invention, the protective screen that is possibly associated with the bumper skin in defining the safety volume may be stationary or transferable, tangible or intangible.

In an embodiment of the invention, the machine further comprises at least one retractable structure carrying at least some of the tools, the retractable structure being capable of occupying a retracted position in which it releases a space facing the support to facilitate positioning a bumper skin on the support, and an operating position in which it holds the tools in their working positions facing a bumper skin that is in position on the support.

The invention may be applied to a variety of plastics material parts of a piece of motor vehicle bodywork, and in particular to bumper skins, or to the skins of fenders or to skirts, where a skirt is a wall extending a bumper downwards, at the front or the rear of a motor vehicle.

The invention is applicable to a skin having lateral portions (also referred to as "overriders") giving a concave shape to the skin and defining an inside volume on the concave side of the skin, and two embodiments can be envisaged. In a first embodiment, the support is arranged to receive a skin with its lateral portions pointing downwards. In a second embodiment of the invention, the support is arranged so as to receive a skin oriented with its lateral portions pointing upwards.

If the machine performs only welding without punching, it is advantageous in the invention for the support to be arranged to receive a skin oriented with its lateral portions pointing upwards.

If the machine performs punching and possibly also welding, it is advantageous in the invention for the support to be arranged, to receive a skin oriented with its lateral portions pointing downwards.

BRIEF DESCRIPTION OF THE DRAWINGS

The invention can be better understood on reading the following description that presents no limiting character and that is given purely by way of example and with reference to the accompanying drawings, in which.

MORE DETAILED DESCRIPTION

Figure 1:
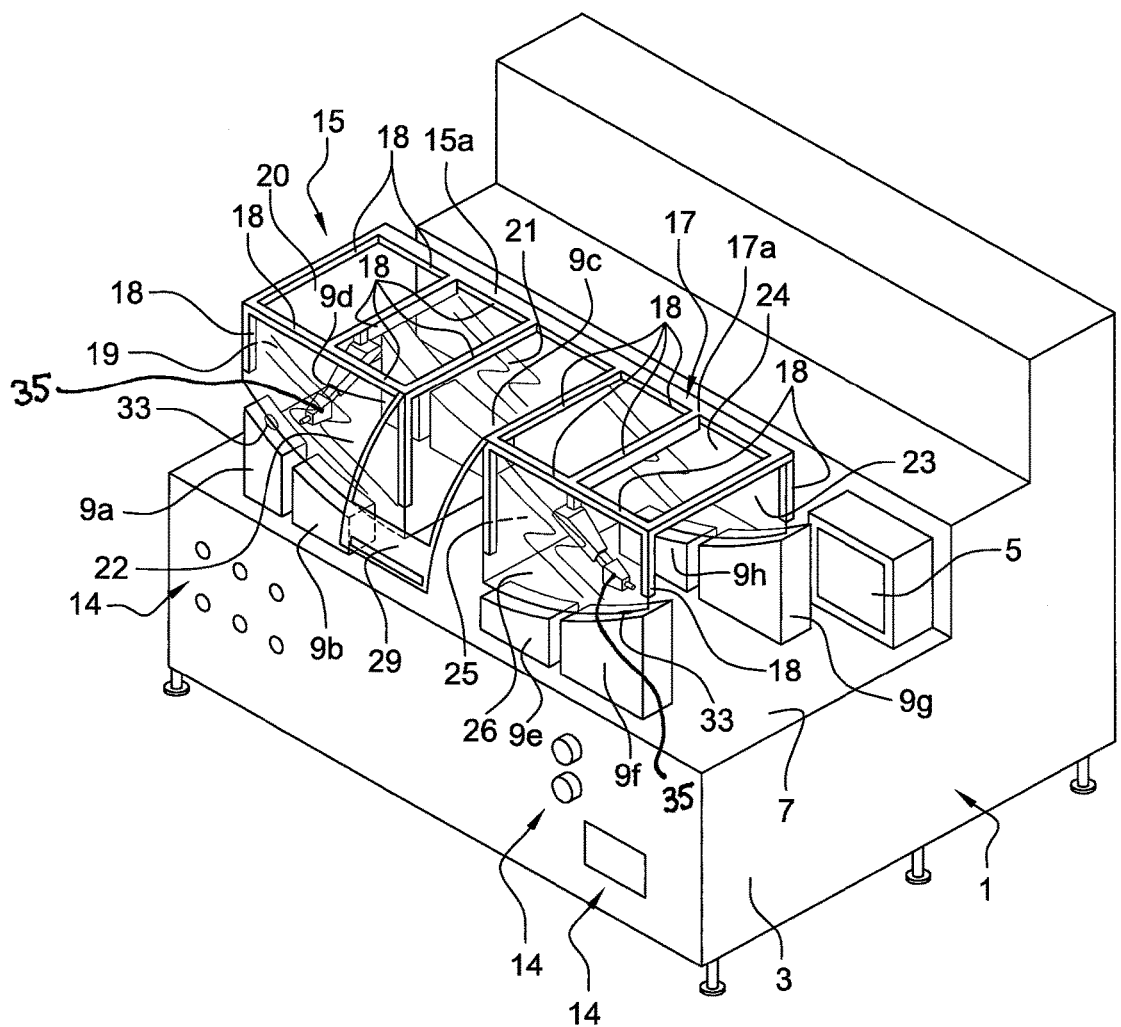
FIG. 1 is a perspective view of a welding machine in a first embodiment of the invention.
Figure 1:
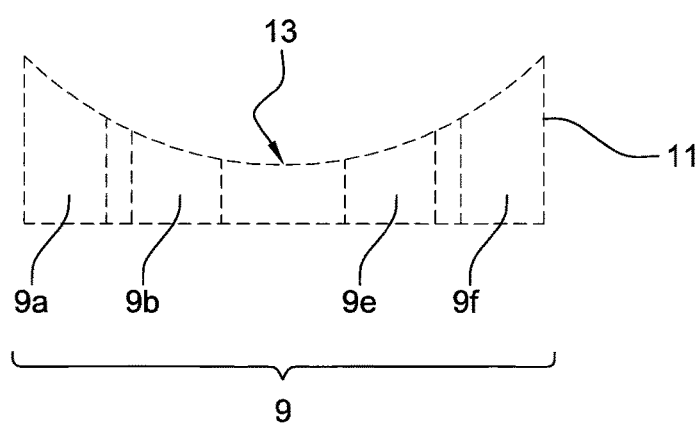

In FIG. 1, the following reference numerals designate the following elements.

1 designates the machine overall.
3 designates the bench of the machine.
5 is a monitor screen.
7 is a work surface.
9 is a support that is fastened on the work surface 7. The support 9 in this example is subdivided into disjoint sections 9a, 9b, 9c, 9d, 9e, 9f, 9g, and 9h that together occupy a volume shown diagrammatically by dashed lines with a base face 11 that is plane and resting on the work surface 7, and with a top face 13 that fits the rounded shape of a bumper skin.

14 is an overall reference designating control knobs, sensors, connectors, and other devices having no direct link with the invention and that are not described in detail herein.

15 and 17 are rectangular-block structures constituted by metal bars 18 occupying the edges of said structures. Each structure is made retractable by the fact that it is mounted to pivot about a hinge placed on its rear horizontal top edge 15a, 17a, and it includes transparent protective screens 19, 20, 21, 22, 23, 24, 25, and 26, on its top horizontal face and on its front and side vertical faces. In the retracted position, the retractable structures 15, 17 release the space above the support 9, thereby enabling a bumper skin (not shown) to be put into place on the support 9 without any risk of scratching the skin.

The two retractable structures 15 and 17 are secured to each other and they can be moved by means of a common handle 29 fastened, as a bridge between the top edges of the two structures.

The protective screens 19, 21, 22, 23, 25, and 26 are subdivided so as to coincide with the shape of a bumper skin (not shown) placed on the support 9. Thus, each front screen 22, 26 follows the inside rounded shape of the bumper skin, and each inner and outer side screen 21, 25 and 19, 23 follows the cross-section of the bumper skin.

When the retractable structures 15 and 17 are folded down into the operating position, as shown in FIG. 1, the screens and the bumper skin (not shown) cooperate with one another to define a volume that is closed (or almost closed, ignoring clearances and in application of the applicable ergonomic and safety standards).

Inside this closed volume, movable welding tools 35 are carried by the structures 15 and 17. In reality, each movable welding tool is half of a welding assembly comprising a movable tool 35 and a stationary tool 33, which tools need to be arranged on opposite sides of the bumper skin in order to weld it. In FIG. 1, the movable tools 35 carried by the structures 15 and 17 are movable sonotrodes that are suitable for transferring from a waiting position, remote from the skin, to a working position, against the skin, by means of actuators, and the stationary tools 33 are anvils incorporated in the sections 9a and 3f of the support 9. When the structures 15 and 17 are retracted, the movable tools 35 are in the retracted position, in which they are remote from the support and do net impede the placing of a bumper skin on the support 9. When the structures 15 and 17 are in the operating position, the movable tools 35 are suitably positioned in a waiting position relative to the bumper skin, so as to be capable of performing the desired welding operations on the bumper skin. In this waiting position, the movable tools are practically in contact with the skin. If necessary, the movable tools 35 may move over a short stroke in order to come into contact with the bumper skin (they include actuators for this purpose), however their movement is then limited to the small safety volume defined by the screens 19, 21, 23, 25, 27, 29, and 31, and by the bumper skin.

During welding operations, the movable tools may possibly be subjected to small movements needed, for performing the welding proper.

The movable tools thus move in the safety volume defined together by the screens and by the bumper skin. In the example described, the tools 35 are both movable and retractable; however they are said to be "movable" as a result of their small movements during the welding operation, and not as a result of maneuvering the structures 15 and 17.

Figure 2:
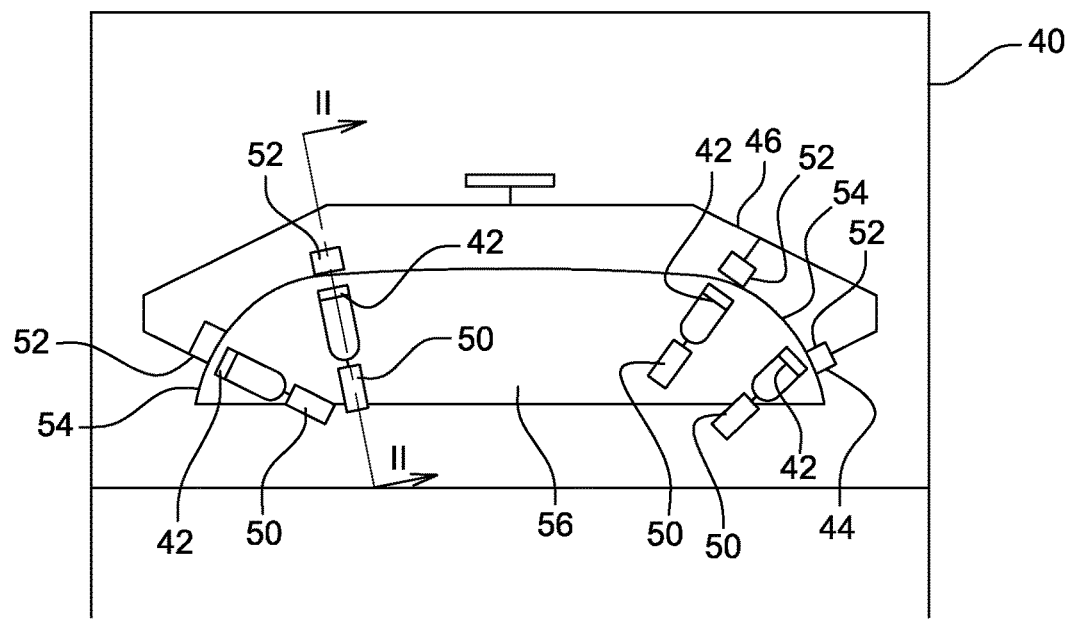
FIG. 2 is a diagrammatic section view of a punching and welding machine in a second embodiment of the invention, the machine being in a position enabling both punching and/or welding operations to be performed.
Figure 3:
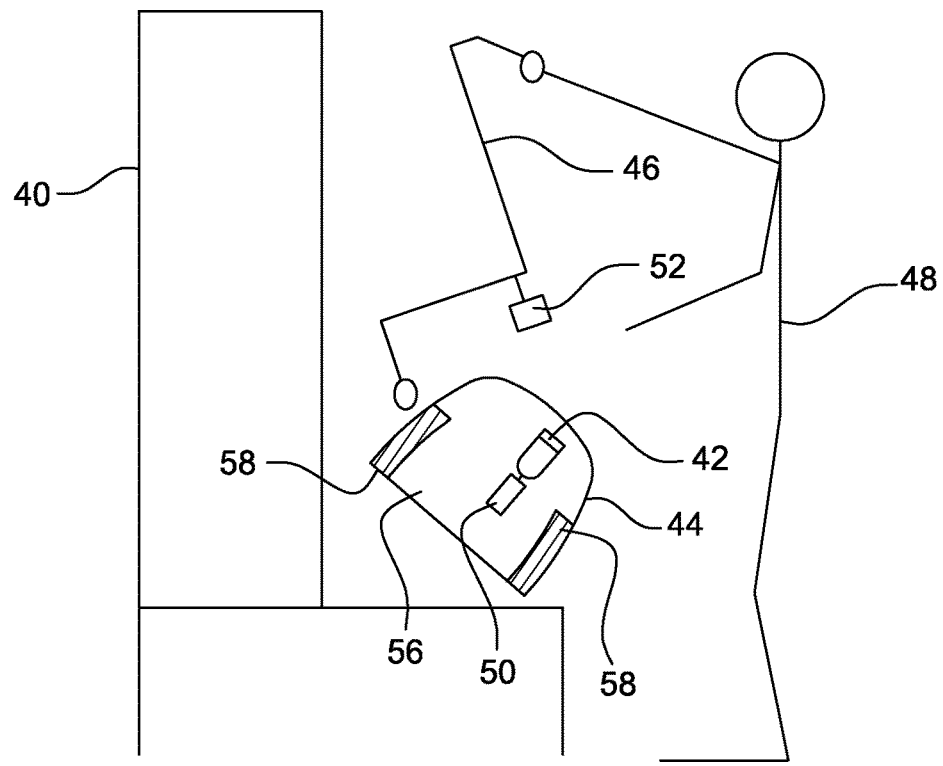
FIG. 3 is a section view on IV-IV of FIG. 2, the machine being in a position prior to beginning punching and/or welding operations.

In the embodiment of FIGS. 2 and 3, there is shown diagrammatically a machine 40 for placing supports 42 on a bumper skin 44 in order to support ultrasound sensors for assisting in parking. Such supports 42 are put into place by specific tooling that, in a single operation, serves not only to punch the bumper skin, but also to insert the support, and to weld the final connection. As above, the machine 40 has a retractable structure 46 that can be maneuvered by the user 48 between a retracted position and an operating position.

Unlike the example of FIG. 1, the retractable structure 46 does not have protective screens, and the bumper skin 44 is positioned with its overriders pointing downwards, with the help of an appropriate support, a few portions of which 58 can be seen in the section of FIG. 4.

Each set of specific tooling is constituted by two movable tools, namely a first movable tool 50 fastened to the support, and a second movable tool 52 carried by the retractable structure 46. The first movable tool 50 is constituted by a die (providing a reaction for punching) and a support/sonotrode carrier capable of acting sequentially to perform the operations of punching the skin 44, of holding a support 42 for a parking assistance sensor, and of welding the sensor support to the skin. These operations require the movable tool 50 to be transferred from its waiting position. The second movable tool 52 is constituted by a punch/stripper and by an anvil (that provides a reaction for welding), the punch/stripper may be driven by an actuator (not shown) that takes it from a retracted position, set back from the skin 44, to a working position, however this transfer is not performed during the punching and welding operations. During said punching and welding operations, the movable tool 52 is subjected to small movements, but towards the inside of the skin, so that it passes from its working position in contact with or in the immediate proximity of the skin, to positions in which its portions that are potentially dangerous for an operator penetrate into the skin, or pass through the skin to be located in the inside volume of the skin.

In this machine 40, the support 58 is arranged in such a manner that the bumper skin 44 is oriented with its laterally-extending portions or "overriders" 54 pointing downwards and co-operating with the portions 58 of the support that also act as screens to define an inside volume 56 on the concave side of the bumper skin. This volume 56 constitutes a safety volume within which the movable tools 50 move during the punching and welding operations.

In the above-described examples, it can be seen that by means of the support and the arrangement of the movable tools, the bumper skin provides some or all of the protective screens serving to provide protection for operators working on the machine.

Naturally, the above-described embodiments do not present any limiting character and they may receive any desirable modification without thereby going beyond the ambit of the invention.

What is claimed is:

1. A punching and/or welding machine configured to act on a skin of a piece of motor vehicle bodywork that includes plastics material, the machine comprising:
   movable punching and/or welding tools, each of which being configured to perform a punching and/or welding operation in three stages:
   a) transferring the movable punching and/or welding tools from a retracted position at a distance from the skin to a working position in contact with or in a close proximity to the skin;
   b) performing the punching and/or the welding; and
   c) returning the movable punching and/or welding tools to the retracted position; and
   a support for receiving the skin in a determined position,
   wherein once the skin is positioned on the support, the skin defines, in association with a protective screen, a safety volume within which the movable punching and/or welding tools is configured to move in order to perform the punching and/or welding operation on the skin, the movable punching and/or welding tools being fastened to the support, and
   wherein the protective screen is subdivided so as to have a non-planar curvature that is conform to a curvature of the support.

2. The machine according to claim 1, adapted to receive the skin having laterally-extending portions giving a concave shape to the skin and defining an inside volume on the concave side of the skin.

3. The machine according to claim 2, wherein the support is arranged to receive the skin, oriented with the laterally-extending portions pointing upwards.

4. The machine according to claim 2, wherein the support is arranged to receive the skin oriented with the laterally-extending portions pointing downwards.

5. A punching and welding machine configured to act on a skin of a piece of motor vehicle bodywork that includes plastics material, the machine comprising:
   movable punching and/or welding tools, each of which being configured to perform a punching and/or welding operation in three stages:
   a) transferring the movable punching and/or welding tools from a retracted position at a distance from the skin to a working position in contact with or in a close proximity to the skin;
   b) performing the punching and/or the welding; and
   c) returning the movable punching and/or welding tools to the retracted position;
   a support for receiving the skin in a determined position; and
   a single retractable structure configured to carry the movable punching and/or welding tools,
   wherein once the skin is positioned on the support, the skin defines, in association with a protective screen, a safety volume within which the movable punching and/or welding tools is configured to move in order to perform the punching and/or welding operation on the skin, the movable punching and/or welding tools being fastened to the support,
   wherein the protective screen is subdivided so as to have a non-planar curvature that is conform to a curvature of the support, and
   wherein the single retractable structure is configured to be in a retracted position in which the retractable structure releases a space facing the support in order to facilitate positioning a skin on the support, and in an operating position in which the retractable structure holds the movable punching and/or welding tools in a working position relative to the skin positioned on the support.

6. The machine of claim 5, wherein the single retractable structure is configured to carry the movable punching and/or welding tools via rotation around a pivot.

7. A machine configured to act on a skin of a motor vehicle bodywork made of plastics material, the machine comprising:
   a) a stationary support for receiving the skin in a determined position in association with a protective screen; and
   b) at least one moveable tool selected from the group consisting of: a punching tool and a welding tool;
   wherein:
   the at least one moveable tool is fastened to the stationary support,
   the at least one moveable tool, skin, and stationary support are configured to create a safety volume;
   the moveable tools are configured to be in a retracted position during placement of the skin on the stationary support, are configured to be in a working position during punching or welding, and are configured to be in a retracted position after punching or welding; and
   the protective screen is subdivided so as to have a non-planar curvature that is conform to a curvature of the stationary support.

8. The machine according to claim 7, further comprising at least one retractable structure carrying the at least one movable tool,
   wherein the retractable structure is configured to be in a retracted position in which the retractable structure releases a space facing the stationary support in order to facilitate positioning of the skin on the stationary support, and an operating position in which the retractable structure holds the at least one movable tool in a working position relative to the skin positioned on the stationary support.

9. The machine according to claim 7, wherein the machine is adapted to receive the skin having laterally-extending portions giving a concave shape to the skin and defining an inside volume on the concave side of the skin.

10. The machine according to claim 9, wherein the at least one moveable tool is a welding tool and the stationary support is arranged to receive a skin, oriented with the laterally-extending portions pointing upwards.

11. The machine according to claim 9, wherein the stationary support is arranged to receive a skin oriented with the laterally-extending portions pointing downwards.

12. A machine configured to act on a skin of a motor vehicle bodywork made of plastics material, the machine comprising:
   a) a stationary support configured to receive the skin in a determined position in association with a protective screen; and
   b) at least one moveable tool selected from the group consisting of: a punching tool and a welding tool; and
   c) at least one retractable structure configured to be maneuvered between a retracted position and an operating position, wherein:
the at least one moveable tool is fastened to the stationary support or the at least one retractable structure;
the at least one moveable tool, skin, and stationary support are arranged to create a safety volume; and
the protective screen is subdivided so as to have a non-planar curvature that is conform to a curvature of the stationary support;
wherein:
(i) when the at least one retractable structure is in a retracted position, the at least one moveable tool is in the retracted position; and
(ii) when the at least one retractable structure is in an operating position, the at least one moveable tool is in a waiting position.

13. The machine according to claim 12, wherein the machine is adapted to receive a skin having laterally-extending portions giving a concave shape to the skin and defining an inside volume on the concave side of the skin.

14. The machine according to claim 13, wherein the at least one moveable tool is a welding tool and the stationary support is arranged to receive a skin, oriented with the laterally-extending portions pointing upwards.

15. The machine according to claim 13, wherein the at least one moveable tool is a punching tool and the stationary support is arranged to receive a skin oriented with the laterally-extending portions pointing upwards.

16. The machine according to claim 13, wherein the stationary support is arranged to receive a skin oriented with the laterally-extending portions pointing upwards.

* * * * *